US009835212B2

(12) United States Patent
Patel

(10) Patent No.: US 9,835,212 B2
(45) Date of Patent: Dec. 5, 2017

(54) ANTI-RATTLE CLIP FOR DISC BRAKE ASSEMBLY AND DISC BRAKE ASSEMBLY INCLUDING SUCH AN ANTI-RATTLE CLIP

(71) Applicant: Kelsey-Hayes Company, Livonia, MI (US)

(72) Inventor: Darpan Patel, Shelby, MI (US)

(73) Assignee: Kelsey-Hayes Company, Livonia, MI (US)

( * ) Notice: Subject to any disclaimer, the term of this patent is extended or adjusted under 35 U.S.C. 154(b) by 25 days.

(21) Appl. No.: 14/659,780

(22) Filed: Mar. 17, 2015

(65) Prior Publication Data
US 2016/0273597 A1     Sep. 22, 2016

(51) Int. Cl.
| F16D 65/38 | (2006.01) |
| F16D 65/00 | (2006.01) |
| F16D 65/097 | (2006.01) |
| F16D 55/226 | (2006.01) |

(52) U.S. Cl.
CPC ....... F16D 65/0006 (2013.01); F16D 55/226 (2013.01); F16D 65/0973 (2013.01)

(58) Field of Classification Search
CPC ............... F16D 65/0006; F16D 65/097; F16D 65/0973; F16D 65/0979; F16D 2121/24; F16D 2125/20; F16D 2125/40
See application file for complete search history.

(56) References Cited

U.S. PATENT DOCUMENTS

| 3,720,293 | A | * | 3/1973 | Hikida | ................. F16D 55/228 188/71.8 |
| 4,174,769 | A | * | 11/1979 | Gerard | ................ F16D 65/0976 188/73.32 |
| 4,290,508 | A | | 9/1981 | Baum | |
| 4,527,669 | A | | 7/1985 | Meyer et al. | |
| 4,969,540 | A | | 11/1990 | Cartwright et al. | |
| 5,219,047 | A | * | 6/1993 | Fouilleux | ............ F16D 65/0979 188/106 F |
| 5,931,268 | A | * | 8/1999 | Kingston | ............ F16D 65/0006 188/158 |
| 8,011,482 | B2 | | 9/2011 | Boyle et al. | |
| 8,844,683 | B2 | | 9/2014 | Sternal et al. | |
| 2007/0261927 | A1 | * | 11/2007 | Iraschko | ............ F16D 65/0006 188/73.38 |
| 2013/0327606 | A1 | | 12/2013 | Platzer et al. | |

OTHER PUBLICATIONS

PCT International Search Report and Written Opinion, Application No. PCT/US2016/022596, dated Jun. 7, 2016.

* cited by examiner

*Primary Examiner* — Nicholas J Lane
(74) *Attorney, Agent, or Firm* — MacMillan, Sobanski & Todd, LLC

(57) ABSTRACT

A motor vehicle disc brake assembly comprises a caliper having a cavity, a brake disc rotatable relative to the caliper, a brake lining mounted to the caliper, a piston mounted in the cavity for displacing the brake lining against the brake disc, and an electromechanical actuator for supporting the piston. The electromechanical actuator has a drive assembly operably connected to a spindle, a rotationally restrained spindle nut threaded on the spindle, and an anti-rattle clip coupling together the piston and spindle nut. Rotation of the spindle by the drive assembly moves the spindle nut to support the piston.

14 Claims, 8 Drawing Sheets

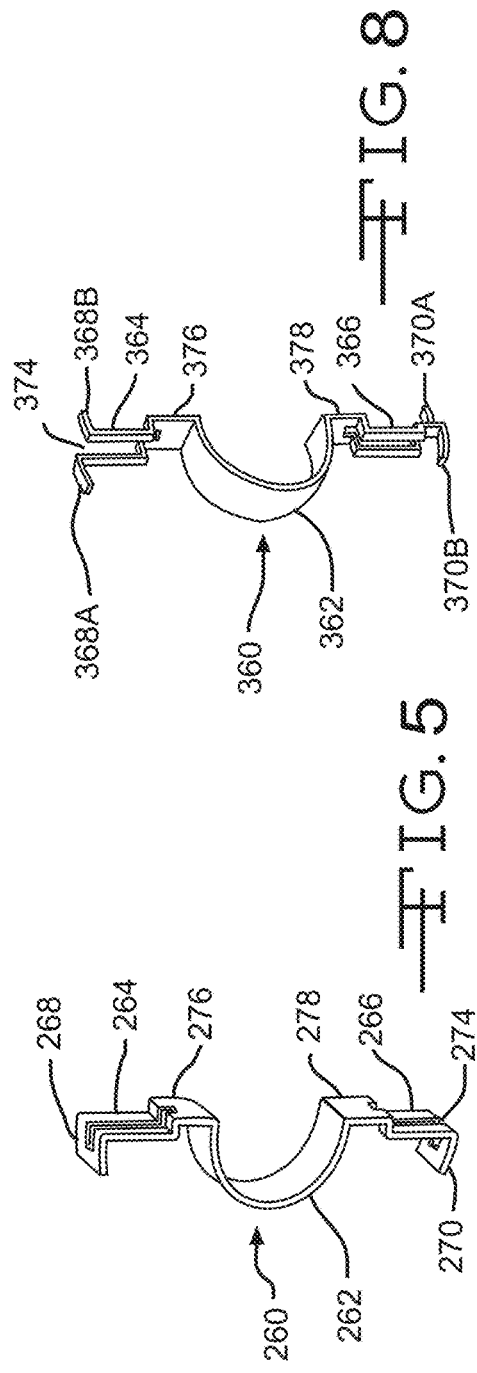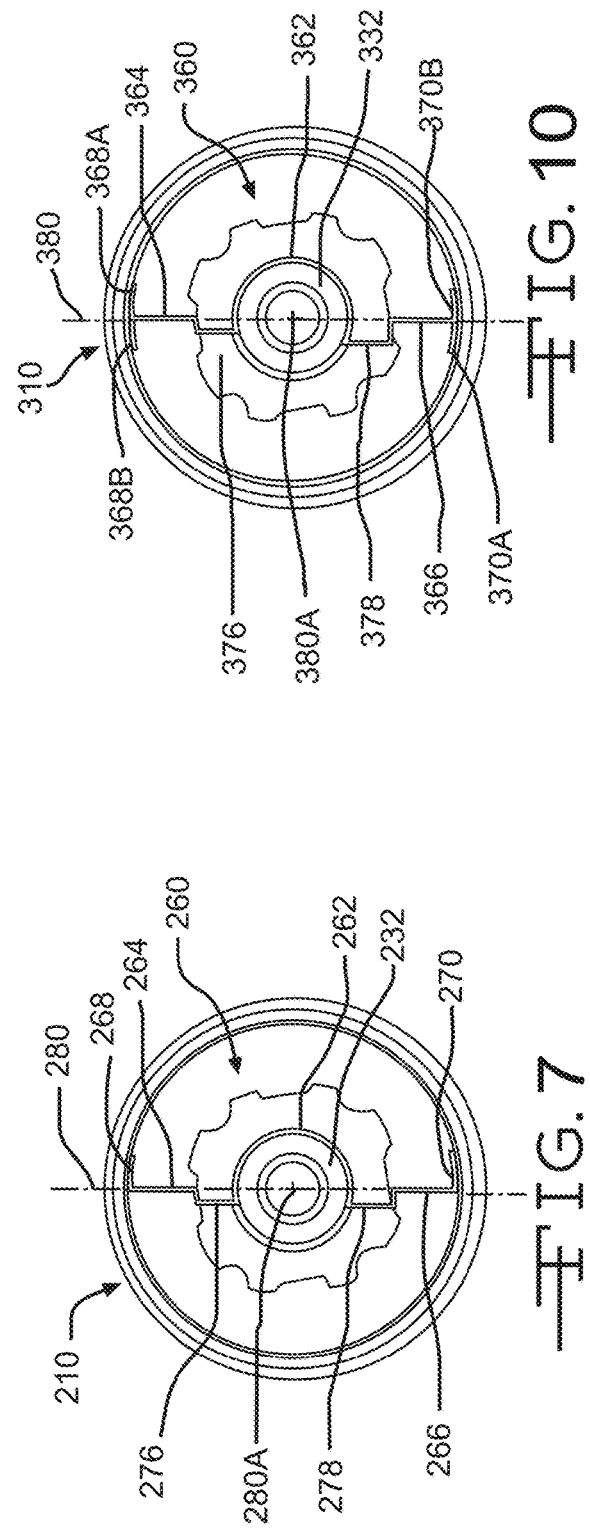

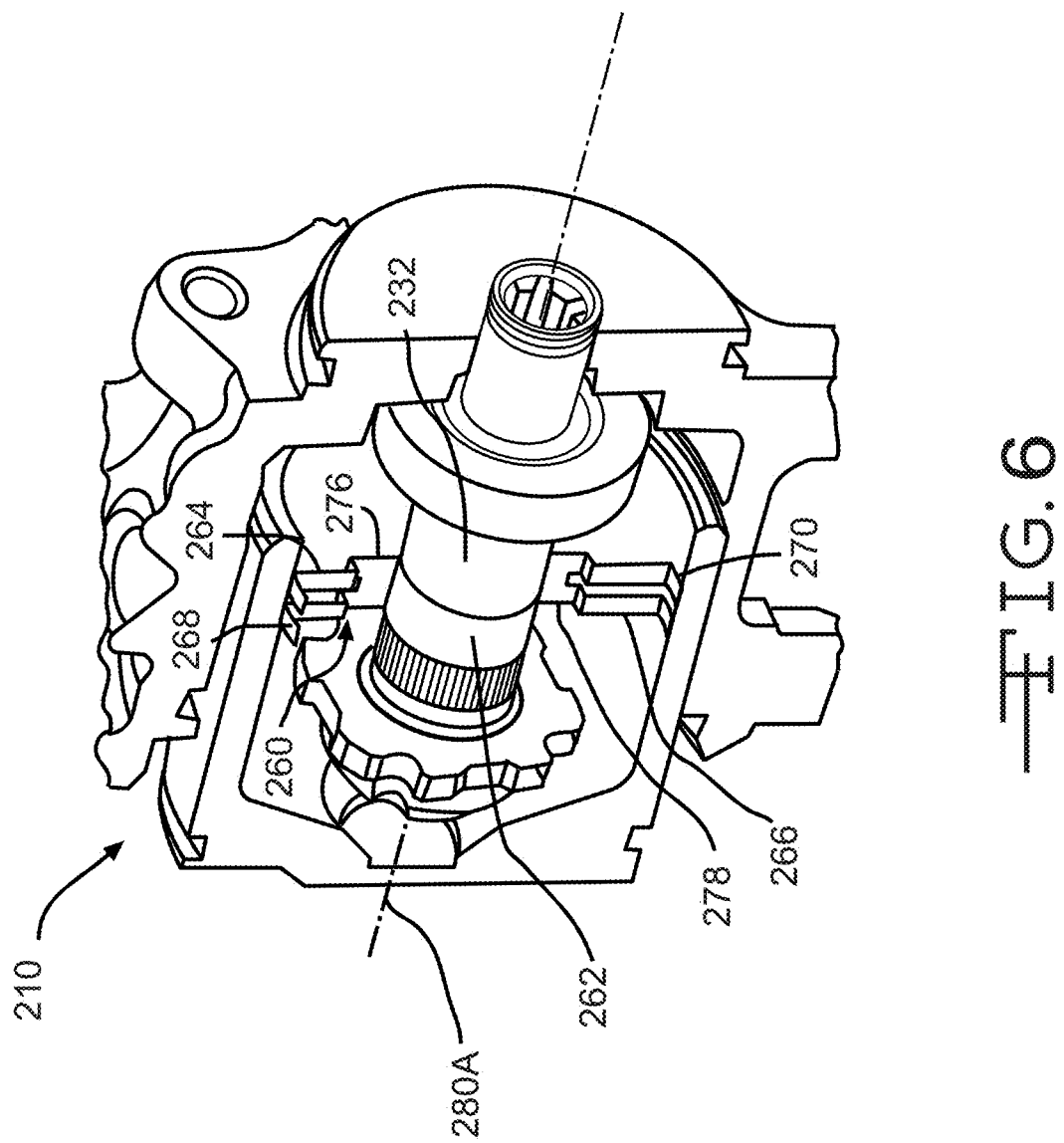

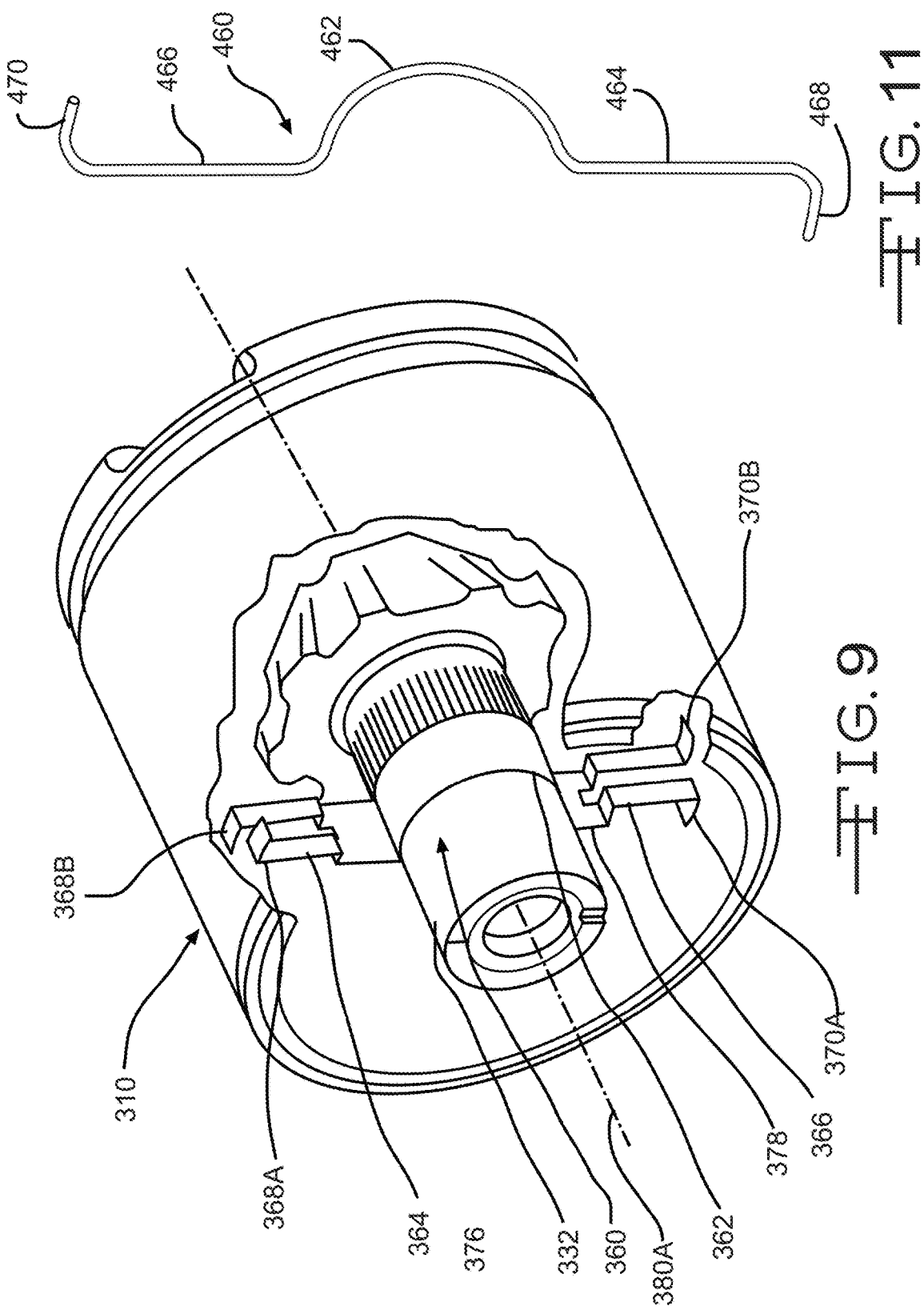

ANTI-RATTLE CLIP FOR DISC BRAKE ASSEMBLY AND DISC BRAKE ASSEMBLY INCLUDING SUCH AN ANTI-RATTLE CLIP

BACKGROUND OF INVENTION

This invention relates in general to vehicle disc brake assemblies and in particular to an improved structure for an electric parking brake actuator for use in such a disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a brake rotor which is secured to a wheel of the vehicle for rotation therewith. The disc brake assembly further includes a caliper assembly that is slidably supported on pins secured to an anchor bracket. The anchor bracket is secured to a non-rotatable component of the vehicle, such as the axle flange or steering knuckle, which is connected to the vehicle frame. The caliper assembly includes a pair of brake pads which are disposed on opposite sides of the brake rotor. The brake pads are connected to one or more hydraulically or pneumatically actuated pistons for movement between a non-braking position and a braking position, wherein they are moved into frictional engagement with the opposed braking surfaces of the brake rotor. For example, when an operator of the vehicle depresses the brake pedal, the piston urges the brake pads from the non-braking position to the braking position so as to frictionally engage the opposed braking surfaces of the brake rotor and thereby slow or stop rotation of the associated wheel of the vehicle.

The disc brake assembly may also include an electromechanical actuating device that is used to realize a parking brake function of the disc brake assembly. The electromechanical actuating device may comprise a rotationally restrained nut threaded onto a motor driven spindle. As the spindle is rotationally driven, the nut axially translates to move the piston and urge the brake pads between the braking and non-braking positions. The piston may be hollow with the nut and spindle located inside the piston. However, the electromechanical actuating device may produce an undesirable noise or rattle from the nut contacting and/or moving the piston. Therefore, it would be desirable to reduce or minimize any noise or rattle in the electromechanical actuating device for the disc brake assembly.

SUMMARY OF INVENTION

This invention relates to an anti-rattle clip for use in a disc brake assembly and a disc brake assembly including such an anti-rattle clip.

According to one embodiment, a disc brake assembly for a motor vehicle may comprise, individually and/or in combination, one or more of the following features: a caliper having a cavity, a brake lining mounted to the caliper, a piston mounted in the cavity for displacing the brake lining, and an electromechanical actuator for supporting the piston. The electromechanical actuator has a drive assembly configured to be operatively connected to a spindle, a spindle nut configured to be operatively coupled to the spindle, and an anti-rattle clip configured to couple together the piston and spindle nut. Rotation of the spindle by the drive assembly axially moves the spindle nut to engage and move the piston.

According to another embodiment, an electromechanical actuator for a disc brake assembly may comprise, individually and/or in combination, one or more of the following features: a spindle, a spindle nut, and an anti-rattle clip. The spindle nut is configured to be operatively coupled to the spindle. The anti-rattle clip is fixed to the spindle nut.

According to another embodiment, an anti-rattle clip for a motor vehicle disc brake assembly may comprise, individually and/or in combination, one or more of the following features: a curved central portion, a first web portion, and a first flange. The curved central portion is configured to couple to a spindle nut of an electromechanical actuator. The first web portion extends from the curved central portion. The first flange extends perpendicularly from the first web portion and is configured to exert a load against a piston of the disc brake assembly.

A potential advantage of an embodiment of the anti-rattle clip is reduced rattle in the electromechanical actuating device for the disc brake assembly.

Other advantages of this invention will become apparent to those skilled in the art from the following detailed description of the preferred embodiments, when read in light of the accompanying drawings.

BRIEF DESCRIPTION OF DRAWINGS

FIG. 5 is a perspective view of a second embodiment of an anti-rattle clip in accordance with the present invention.

FIG. 6 is a sectional perspective view of an electromechanical actuator for a disc brake assembly using the second embodiment of the anti-rattle clip illustrated in FIG. 5.

FIG. 7 is a sectional view of an electromechanical actuator for a disc brake assembly using the second embodiment of the anti-rattle clip illustrated in FIG. 5

FIG. 8 is a perspective view of a third embodiment of an anti-rattle clip in accordance with the present invention.

FIG. 9 is a sectional perspective view of an electromechanical actuator for a disc brake assembly using the third embodiment of the anti-rattle clip illustrated in FIG. 8.

FIG. 10 is a sectional view of an electromechanical actuator for a disc brake assembly using the third embodiment of the anti-rattle clip illustrated in FIG. 8.

FIG. 11 is a perspective view of a fourth embodiment of an anti-rattle clip in accordance with the present invention.

DETAILED DESCRIPTION OF THE PREFERRED EMBODIMENTS

Figure 1:
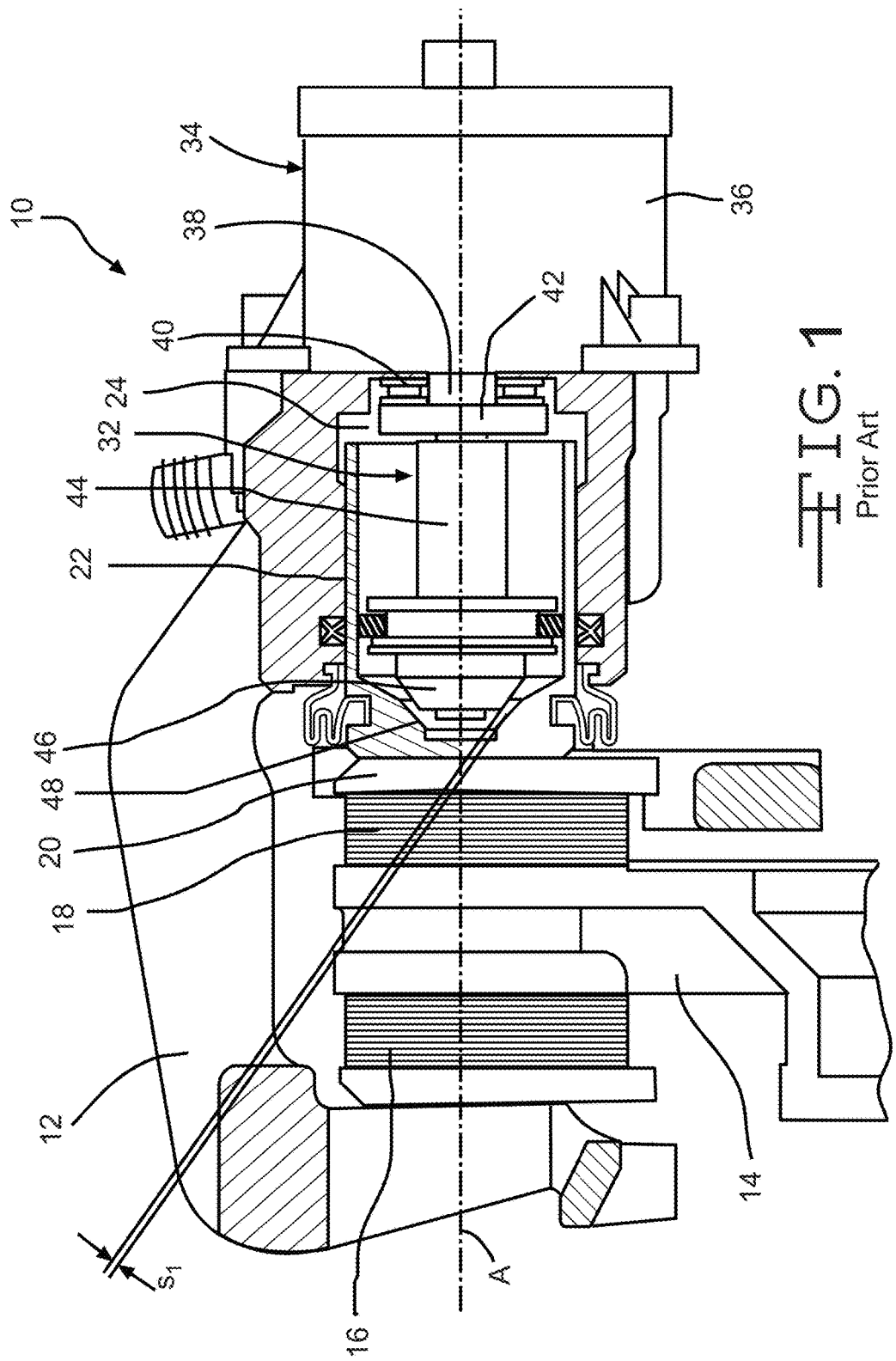
FIG. 1 is a partial sectional view of a prior art electromechanical actuator for a disc brake assembly.

Referring now to FIG. 1, there is illustrated a portion of a prior art disc brake assembly, indicated generally at 10.

The disc brake assembly 10 is well known to those skilled in the art and may be, for example, such as is disclosed by U.S. Pat. No. 8,844,683 to Sternal et al, the disclosure of which is hereby incorporated by reference in entirety herein Although this invention will be described and illustrated in connection with the particular prior art disc brake assembly 10 disclosed herein, it will be appreciated that this invention may be used in connection with other types or kinds of disc brake assemblies, if so desired.

The prior art disc brake assembly 10 includes a brake caliper 12, which is mounted in a floating manner by means of a brake carrier (not illustrated) in a manner known to those skilled in the art, and which spans a brake disc 14 that is coupled to a vehicle wheel (not illustrated) in a rotationally fixed manner. Provided in the brake caliper 12 is a brake lining assembly, which has an outboard brake lining 16 that bears on the brake caliper 12, and an inboard brake lining 18 that bears on an actuating piston 22. The outboard and inboard brake linings 16 and 18, respectively, face towards each other and, in a release position illustrated in FIG. 1, are disposed with a small air clearance on both sides of the brake disc 14, such that no significant residual drag moments occur. A brake lining carrier 20 is disposed between the inboard brake lining 18 and the piston 22 for the inboard brake lining 18 and actuating piston 22 to move jointly. The piston 22 is mounted in a movable manner in a cylindrical cavity 24 in the brake caliper 12.

In addition, it can be seen in FIG. 1 that the piston 22 is realized so as to be hollow. Accommodated in the piston 22 is a rotationally restrained spindle nut or thrust piece, indicated generally at 32, of an electromechanical actuator, indicated generally at 34. The actuator 34 includes a drive assembly 36 having an electric motor and transmission assembly. An output shaft 38 of the drive assembly 36 drives a drive spindle 42, which is supported via an axial bearing 40 and which is accommodated in a threaded manner in a threaded receiver 44 of the spindle nut 32.

The spindle nut 32 has a conical portion 46, which can be brought into bearing contact with a complementarily conical inner surface 48 of the piston 22. In the release position shown in FIG. 1, there is a clearance $S_1$ between the conical portion 46 and conical inner surface 48.

If service braking is desired for a vehicle having the disc brake assembly 10, the disc brake assembly 10 is hydraulically actuated. For example, the disc brake assembly may be hydraulically actuated by a driver via a brake pedal or via a drive assistance system. When the disc brake assembly 10 is hydraulically actuated, hydraulic fluid is pressurized (by a suitable means known to those skilled in the art) in the cavity 24 such that the piston 22 is displaced leftward along a longitudinal axis A. As a consequence, and as is known to those skilled in the art, the inboard brake lining 18 is pressed onto the brake disc 14 by means of the brake caliper 12 and, at the same time, a corresponding displacement of the brake caliper 12 on an opposite side of the brake disc 14 causes the outboard brake lining 16 to be drawn against the opposite side of the brake disc 14.

As a result of the application of the pressurized hydraulic fluid to the cavity 24, the piston 22 is displaced leftward in FIG. 1, along the longitudinal axis A towards the brake disc 14. The spindle nut 32 remains unactuated, and therefore remains at an initial axial position illustrated in FIG. 1.

For activating the parking brake, in a manner similar to service braking, the piston 22 is first put into an active braking position through application of hydraulic pressure. Actuation of the actuator 34 then causes the spindle nut 32 to be displaced towards the brake disc 14, until the clearance $S_1$ has been used up and the conical portion 46 bears on the corresponding conical inner surface 48 inside the piston 22. As a result, the piston 22 is axially supported, via the spindle nut 32 and the axial bearing 40, on the housing of the brake caliper 12 in a parking brake state.

Once the piston 22 is axially supported, the hydraulic pressure in the cavity 24 can be removed. The parking brake state is maintained because of the position of the spindle nut 32 and because of self-arresting (for example, by a self-arresting transmission between the spindle 42 and the receiver 44). The outboard and inboard brake linings 16 and 18, respectively, pressing against the brake disc 14 are supported via the spindle nut 32.

If the parking brake state is to be released, then pressurized hydraulic fluid is again introduced into the cavity 24. As a result, the piston 22 is displaced slightly leftward, in the axial direction A, towards the brake disc 14 such that the spindle nut 32 is relieved of axial load. Through control of the actuator 34, the spindle nut 32 can be displaced back into the initial position as illustrated in FIG. 1.

Figure 2:
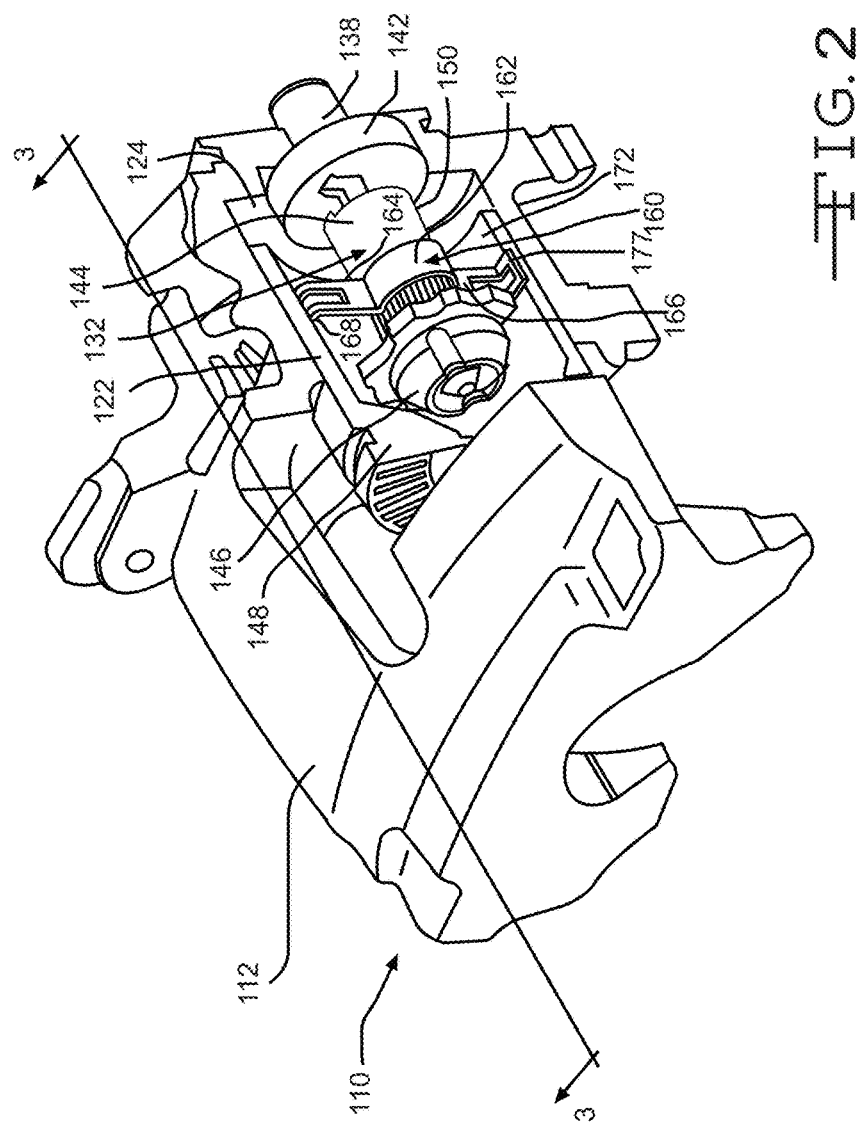
FIG. 2 is a sectional perspective view of an electromechanical actuator for a disc brake assembly using a first embodiment of an anti-rattle clip in accordance with the present invention.
Figure 3:
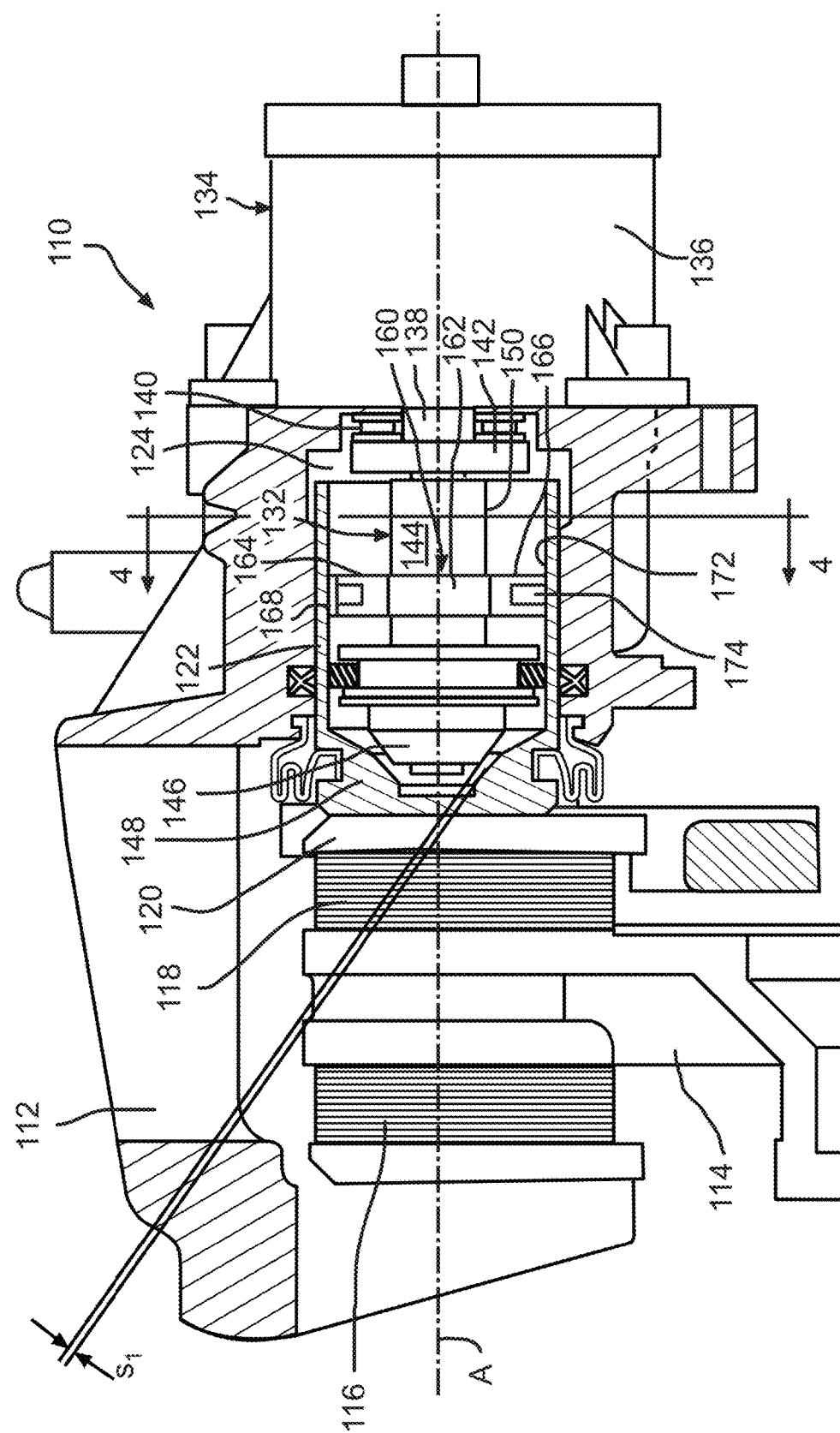
FIG. 3 is a sectional view taken along line 3-3 of FIG. 2.
Figure 4:
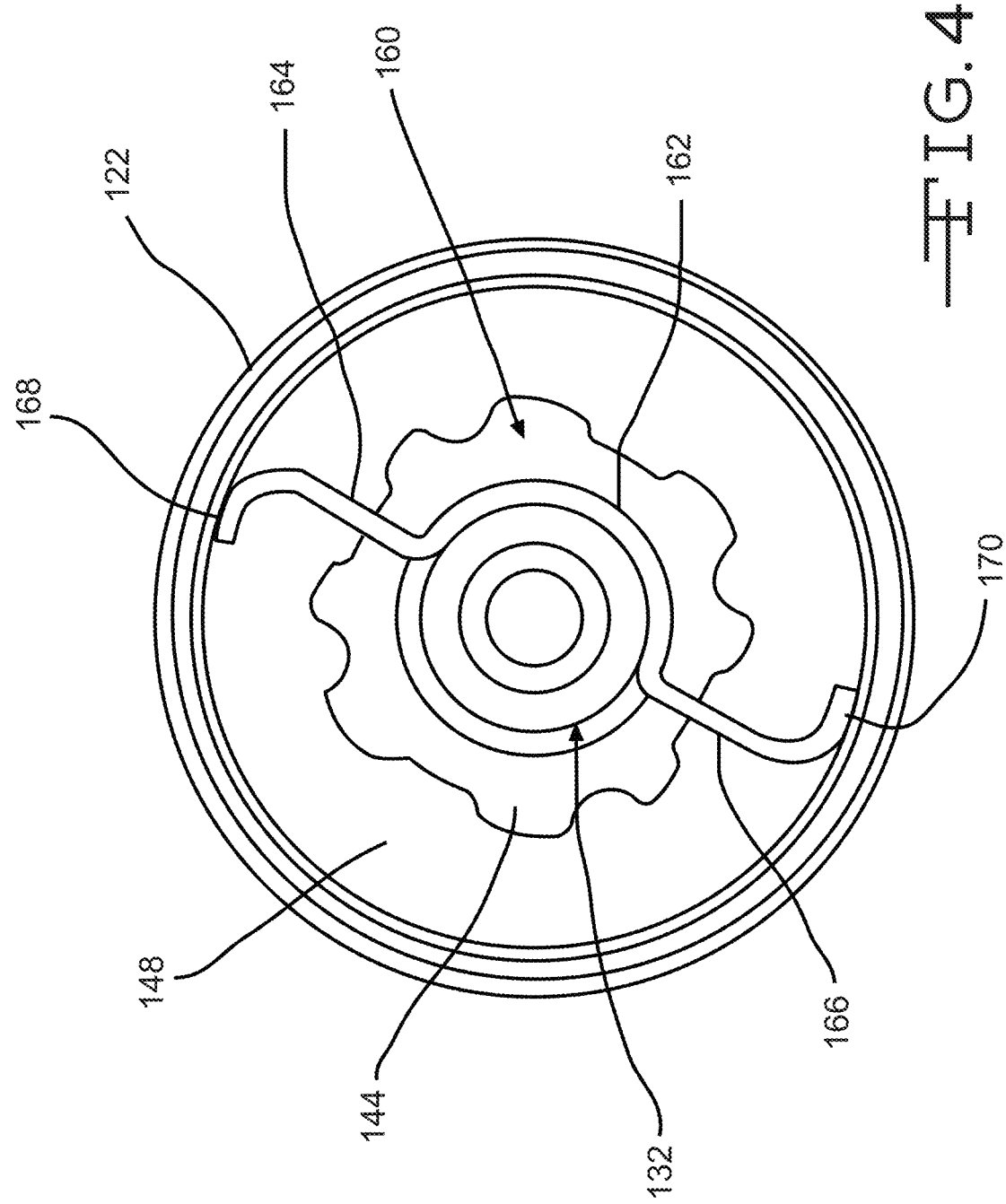
FIG. 4 is a sectional view taken along line 4-4 of FIG. 3.

Referring now to FIGS. 2-4, there is illustrated a first embodiment of an anti-rattle clip, indicated generally at 160, produced in accordance with the present invention and for use with a disc brake assembly, indicated generally at 110 in FIGS. 2 and 3. The general structure and operation of the disc brake assembly 110 is well known in the prior art. For example, the disc brake assembly 110 may be similar to the prior art disc brake assembly 10 illustrated and discussed above in connection with FIG. 1. Alternatively, the particular anti-rattle clip 160 of the present invention, and the alternate embodiments thereof, may be used in connected with other types or kinds of disc brake assemblies, if so desired.

The disc brake assembly 110 includes a brake caliper 112, which is mounted in a floating manner by means of a brake carrier (not illustrated) in a manner known to those skilled in the art, and which spans a brake disc 114 that is coupled to a vehicle wheel (not illustrated) in a rotationally fixed manner. Provided in the brake caliper 112 is a brake lining assembly, which has an outboard brake lining 116 that bears on the brake caliper 112, and an inboard brake lining 118 that bears on an actuating piston 122. The outboard and inboard brake linings 116 and 118, respectively, face towards each other and, in a release position shown in FIG. 3, are disposed with a small air clearance on both sides of the brake disc 114, such that no significant residual drag moments occur. A brake lining carrier 120 is disposed between the inboard brake lining 118 and the piston 122 for the inboard brake lining 118 and piston 122 to move jointly. The piston 122 is mounted in a movable manner in a preferably cylindrical cavity 124 in the brake caliper 112.

In addition, it can be seen that the piston 122 is realized so as to be hollow. Accommodated in the piston 122 is a rotationally restrained spindle nut, indicated generally at 132, of an electromechanical actuator, indicated generally at 134. The actuator 134 preferably includes a drive assembly 136 having a suitable electric motor and transmission assembly known to those skilled in the art. An output shaft 138 of the drive assembly 136 drives a drive spindle 142, which is supported via an axial bearing 140 and which is accommodated in a threaded manner in a threaded receiver 144 of the spindle nut 132. An external surface 150 of the spindle nut 132 is preferably cylindrical.

The spindle nut 132 has a conical portion 146, which can be brought into bearing contact with a complementarily conical inner surface 148 of the piston 122. In the release position, there is a clearance $S_1$ between the conical portion 146 and conical inner surface 148. The construction, shape, configuration, and/or make-up of the conical portion 146 and complementary inner surface 148 may be other than illustrated and described, if so desired. For example, the conical portion 146 and inner surface 148 may have other, non-conical complimentary shapes.

If service braking is desired for a vehicle having the disc brake assembly 110, the disc brake assembly 110 is hydraulically actuated. For example, the disc brake assembly may be hydraulically actuated by a driver via a brake pedal or via a drive assistance system. When the disc brake assembly 110 is hydraulically actuated, hydraulic fluid is pressurized (by a suitable means known to those skilled in the art) in the cavity 124 such that the piston 122 is displaced leftward along a longitudinal axis A. As a consequence, and as is known to those skilled in the art, the inboard brake lining 118 is pressed onto the brake disc 114 by means of the brake caliper 112 and, at the same time, a corresponding displacement of the brake caliper 112 on an opposite side of the brake disc 114 causes the outboard brake lining 116 to be drawn against the opposite side of the brake disc 114.

As a result of the application of the pressurized hydraulic fluid to the cavity 124, the piston 122 is displaced leftward in FIG. 3, along the longitudinal axis A towards the brake disc 114 and into an active braking position. The spindle nut 132 remains unactuated, and therefore remains at an initial axial position illustrated in FIG. 3.

For activating the parking brake, in a manner similar to service braking, the piston 122 is first put into the active braking position through application of hydraulic pressure. Actuation of the actuator 134 then causes the spindle nut 132 to be displaced towards the brake disc 114, until the clearance $S_1$ has been used up and the conical portion 146 bears on the corresponding conical inner surface 148 inside the piston 122. As a result, the piston 122 is axially supported, via the spindle nut 132 and the axial bearing 140, on the housing of the brake caliper 112 in a parking brake state.

Once the piston 122 is axially supported, the hydraulic pressure in the cavity 124 can be removed. The parking brake state is maintained because of the position of the spindle nut 132 and because of self-arresting (for example, by a self-arresting transmission between the spindle 142 and the receiver 144). The outboard and inboard brake linings 116 and 118, respectively, pressing against the brake disc 114 are supported via the spindle nut 132.

If the parking brake state is to be released, pressurized hydraulic fluid is again introduced into the cavity 124. As a result, the piston 122 is displaced slightly leftward, in the axial direction A, towards the brake disc 114 such that the spindle nut 132 is relieved of axial load. Through control of the actuator 134, the spindle nut 132 can be displaced back into the initial axial position illustrated in FIG. 3.

As best shown in FIG. 4, the actuator 134 includes the first embodiment of the anti-rattle clip 160. In the illustrated embodiment, the anti-rattle clip 160 includes a curved central portion 162, first and second web or leg portions 164 and 166, respectively, and first and second "end" flanges 168 and 170, respectively. In the illustrated embodiment, the central portion 162 is preferably an arc of preferably around 180 degrees and the first and second web portions 164 and 166 extend from the central portion 162 in opposing directions towards an internal surface 172 of the piston 122. The first flange 168 extends generally perpendicular from the first web portion 164 at the internal surface 172. The second flange 170 extends generally perpendicular from the second web portion 166 at the internal surface 172. As illustrated, the first and second flanges 168 and 170, respectively, extend in opposing directions. The first and second flanges 168 and 170, respectively, may each be planar or may be curved to fit the internal surface 172. Alternatively, the construction, shape, configuration, and/or make-up of the anti-rattle clip 160 may be other than illustrated and described, if so desired. For example, the first and second flanges 168 and 170, respectively, may extend in other than opposing directions or be omitted. Also, the clip 160 may include only the central portion 162 and only one of the first and second web portions 164 and 166, respectively, and its associated first or second flange 168 or 170, respectively.

In the illustrated embodiment, the anti-rattle clip 160 couples the piston 122 and the spindle nut 132 by exerting a tuned load on the piston 122 and spindle nut 132. As will be discussed below, the anti-rattle clip 160 preferably exerts the tuned load on both the external surface 150, via the central portion 162, and on the internal surface 172, via the first and second flanges 168 and 170, respectively. The first and second flanges 168 and 170, respectively, exert the tuned load against the internal surface 172 but are not fixed to the internal surface 172. As such, the anti-rattle clip 160 moves with the spindle nut 132 as the spindle nut 132 is displaced and the first and second flanges 168 and 170, respectively, are free to move along the internal surface 172.

The central portion 162 is fixed to the external surface 150 such that the anti-rattle clip 160 moves with the spindle nut 132. In the illustrated embodiment, the central portion 162 is preferably welded to the spindle nut 132. Alternatively, the central portion 162 may be otherwise fixed to the external surface 150. For example, the central portion 162 may be fixed to the external surface 150 by an interference fit.

The first and second flanges 168 and 170, respectively, exert a spring load against the internal surface 172. In the illustrated embodiment, the spring load is produced by the first flange 168 being bent generally perpendicular from the first web portion 164 and the second flange 170 being bent generally perpendicular from the second web portion 166. The anti-rattle clip 160 is produced from a resilient material such that the first flange 168 desires to return in line with the first web portion 164 and the second flange 170 desires to return in line with the second web portion 166.

The first and second flanges 168 and 170, respectively, desiring to return in line with the first and second web portions 164 and 166, respectively, produces the spring load against both the internal surface 172 and the external surface 150. The spring load may be adjusted to produce the tuned load. The tuned load may be adjusted to compensate for specific vibration frequencies of the piston 122, spindle nut 132, and/or the disc brake assembly 110.

Alternatively the anti-rattle clip 160 may be fixed to the internal surface 172 such that the anti-rattle clip 160 moves with the piston 122. For example, the first and second flanges 168 and 170, respectively, may be welded to the internal surface 172. The central portion 162 may then be fitted to the external surface 150 by an interference fit that permits the spindle nut 132 to move relative to the anti-rattle clip 160. When the anti-rattle clip 160 is fixed to the internal surface 172 such that the anti-rattle clip 160 moves with the piston 122, the first flange 168 being bent generally perpendicular from the first web portion 164 and the second flange 170 being bent generally perpendicular from the second web portion 166 still produces the spring load which in turn produces the tuned load.

The anti-rattle clip 160 is produced from a resilient material. For example, the anti-rattle clip 160 may be produced from a metal strip using a bending operation. Alternatively, the anti-rattle clip 160 may be produced from other suitable materials, such as plastic, using a molding or casting operation. The anti-rattle clip 160 may be produced with a plurality of openings 174.

As illustrated, the anti-rattle clip 160 and the actuator 134 are part of the disc brake assembly 110 having an electric parking brake system. Alternatively, as one skilled in the art will readily understand, the anti-rattle clip 160 and the actuator 134 may be part of other types of brake assemblies. For example, the anti-rattle clip 160 and the actuator 134 may be incorporated into a drum-in-hat disc brake assembly having a parking brake, such as is disclosed by U.S. Pat. No. 8,011,482 to Boyle et al, the disclosure of which is hereby incorporated by reference in entirety herein.

Referring now to FIGS. 5-7 there is illustrated a second embodiment of an anti-rattle clip, indicated generally at 260, produced in accordance with the present invention and for use with a disc brake assembly 210. Because the anti-rattle clip 260 is a variation of the anti-rattle clip 160 of FIGS. 2-4, like reference numerals, increased by 100, designate corresponding parts in the drawings and detailed description thereof will be omitted.

The anti-rattle clip 260 includes a curved central portion 262, first and second bends 276 and 278, respectively, first and second webs 264 and 266, respectively, and first and second flanges 268 and 270, respectively. The central portion 262 is preferably an arc of preferably greater than 180 degrees. The first bend 276 connects the central portion 262 to the first web 264 such that the first web 264 aligns with a vertical axis 280. For example, the vertical axis 280 may radially extend through a spindle nut 232. As illustrated, the vertical axis 280 passes through a center point 280A of the spindle nut 232. The second bend 278 connects the central portion 262 to the second web 266 such that the second web 266 aligns with the vertical axis 280.

Referring now to FIGS. 8-10 there is illustrated a third embodiment of an anti-rattle clip, indicated generally at 360, produced in accordance with the present invention and for use with a disc brake assembly 310. Because the anti-rattle clip 360 is a variation of the anti-rattle clip 260 of FIGS. 5-7, like reference numerals, increased by 100, designate corresponding parts in the drawings and detailed description thereof will be omitted.

The anti-rattle clip 360 includes a first flange 368A, second flange 368B, third flange 370A, and fourth flange 370B. The first and second flanges 368A and 368B, respectively, extend from a first web portion 364 and the third and fourth flanges 370A and 370B, respectively, extend from a second web portion 366. As illustrated, the first and second flanges 368A and 368B, respectively, are in opposing directions and the third and fourth flanges 370A and 370B, respectively, are in opposing directions. The construction, shape, configuration, and/or make-up of the anti-rattle clip 360 may be other than illustrated and described, if so desired. For example, the first and second flanges 368A and 368B, respectively, and the third and fourth flanges 370A and 370B, respectively, may be in other than opposing directions. For example, the first and second flanges 368A and 368B, respectively, or the third and fourth flanges 370A and 370B, respectively, may be in a common direction.

Referring now to FIG. 11 there is illustrated a fourth embodiment of an anti-rattle clip, indicated generally at 460, produced in accordance with the present invention and for use with a disc brake assembly. Because the anti-rattle clip 460 is a variation of the anti-rattle clip 160 of FIGS. 2-4, like reference numerals, increased by 300, designate corresponding parts in the drawings and detailed description thereof will be omitted.

The anti-rattle clip 460 is fabricated from an elongated, resilient material. For example, the anti-rattle clip 460 may be produced from a metal wire using a bending operation.

As illustrated, the anti-rattle clip 460 has a shape of the anti-rattle clip 160 illustrated in the first embodiment. Alternatively, the anti-rattle clip 460 may have the shape of the anti-rattle clips 260 or 360 of the second or third embodiments, respectively.

Figure 12:
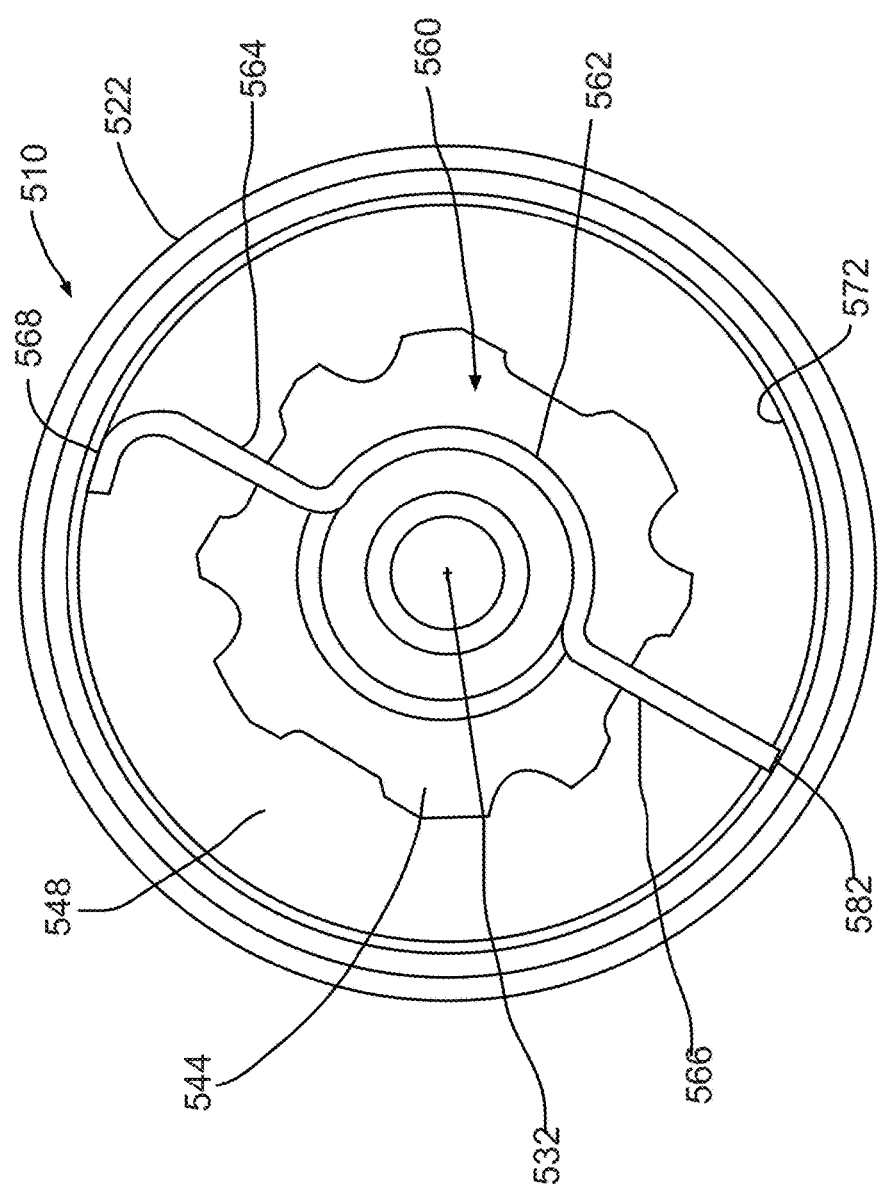
FIG. 12 is a sectional view of an electromechanical actuator for a disc brake assembly using a fifth embodiment of an anti-rattle clip in accordance with the present invention.

Referring now to FIG. 12 there is illustrated a fifth embodiment of an anti-rattle clip, indicated generally at 560, produced in accordance with the present invention and for use with a disc brake assembly 510. Because the anti-rattle clip 560 is a variation of the anti-rattle clip 160 of FIGS. 2-4, like reference numerals, increased by 400, designate corresponding parts in the drawings and detailed description thereof will be omitted.

An internal surface 572 of an actuating piston 522 has a radial slot 582. The radial slot 582 extends substantially parallel to the spindle nut 532 and for a length that is at least as long as the spindle nut 532 is displaceable. A second web portion 566 of the anti-rattle clip 560 is seated in the slot 582. The construction, shape, configuration, and/or make-up of the anti-rattle clip 560 may be other than illustrated and described, if so desired. For example, a first web portion 564 may also be seated in a second slot.

Furthermore, as illustrated, the anti-rattle clip 560 has a shape of the anti-rattle clip 160 illustrated in the first embodiment. Alternatively, the anti-rattle clip 560 may have the shape of the anti-rattle clip 260 of the second embodiment, the anti-rattle clip 360 of the third embodiment, or the anti-rattle clip 460 of the fourth embodiment.

Figure 13:
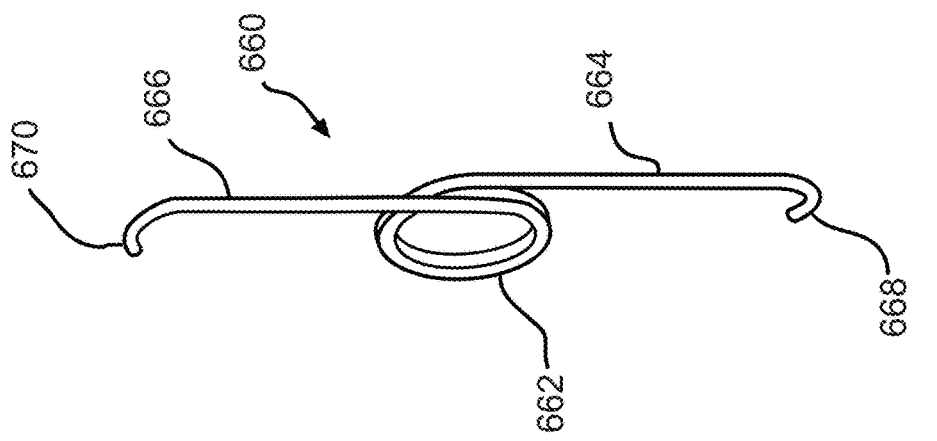
FIG. 13 is a perspective view of a sixth embodiment of an anti-rattle clip in accordance with the present invention.

Referring now to FIG. 13 there is illustrated a sixth embodiment of an anti-rattle clip, indicated generally at 660, produced in accordance with the present invention and for use with a disc brake assembly. Because the anti-rattle clip 660 is a variation of the anti-rattle clip 160 of FIGS. 2-4, like reference numerals, increased by 500, designate corresponding parts in the drawings and detailed description thereof will be omitted.

The anti-rattle clip 660 has a looped central portion 662. The looped central portion 662 secures the anti-rattle clip 660 to an external surface of a spindle nut—e.g., the external surface 150 of the spindle nut 132. The anti-rattle clip 660 is fabricated from an elongated, resilient material. For example, the anti-rattle clip 660 may be produced from a metal wire using a bending operation. The looped central portion 662 is sized smaller than a diameter of the spindle nut.

To install the anti-rattle clip 660 on the spindle nut, first and second web portions 664 and 666, respectively, are pushed towards the looped central portion 662 to expand a diameter of the looped central portion 662 to greater than the diameter of the spindle nut. The expanded looped central portion 662 is slid onto the spindle nut and the first and second web portions 664 and 666, respectively, are released. The expanded looped central portion 662 then contracts and secures the anti-rattle clip 660 to the spindle nut.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A disc brake assembly for a motor vehicle, the disc brake assembly comprising:
   a caliper having a cavity;

a brake lining mounted to the caliper;
a piston mounted in the cavity for displacing the brake lining; and
an electromechanical actuator for supporting the piston, the electromechanical actuator having:
  a drive assembly configured to be operatively connected to a spindle;
  a spindle nut configured to be operatively coupled to the spindle, wherein rotation of the spindle by the drive assembly axially moves the spindle nut to engage and move the piston; and
  an anti-rattle clip configured to operatively couple together the piston and the spindle nut, the anti-rattle clip comprising a singular curved central portion, only a first web portion and a second web portion and only a first end flange and a second end flange, the curved central portion configured to be fixed to the spindle nut so as to move therewith and configured as a continuous arc of around 180 degrees, the first and second web portions extending from the central portion in opposing directions towards an internal surface of the piston, the first flange extending generally perpendicular from the first web portion at the internal surface, the second flange extending generally perpendicular from the second web portion at the internal surface, and wherein the first and second flanges are configured to exert a spring load against the internal surface of the piston.

2. The disc brake assembly of claim 1 wherein the anti-rattle clip couples the piston and spindle nut by exerting a tuned load on both the piston and spindle nut.

3. The disc brake assembly of claim 1 further comprising:
a slot in an internal surface of the piston, wherein the anti-rattle clip is seated in the slot.

4. The disc brake assembly of claim 1 wherein the anti-rattle clip further comprises:
a first bend between the curved central portion and the first web portion; and
a second bend between the curved central portion and the second web portion, wherein the first bend aligns the first web portion with a vertical axis and the second bend aligns the second web portion with the vertical axis.

5. The disc brake assembly of claim 1 wherein the anti-rattle clip is formed from a metal wire.

6. The disc brake assembly of claim 1 wherein the first and second end flanges extend in opposite directions.

7. The disc brake assembly of claim 1 wherein the central portion is fixed to the spindle nut by welding.

8. The disc brake assembly of claim 1 wherein the first and second flanges are configured to be one of planar or curved to fit the internal surface.

9. A disc brake assembly for a motor vehicle, the disc brake assembly comprising:
a caliper having a cavity;
a brake lining mounted to the caliper;
a piston mounted in the cavity for displacing the brake lining; and
an electromechanical actuator for supporting the piston, the electromechanical actuator having:
  a drive assembly configured to be operatively connected to a spindle;
  a spindle nut configured to be operatively coupled to the spindle, wherein rotation of the spindle by the drive assembly axially moves the spindle nut to engage and move the piston; and
  an anti-rattle clip configured to operatively couple together the piston and the spindle nut, the anti-rattle clip comprising a singular curved central portion, only a first web portion and a second web portion and only a first end flange and a second end flange, the curved central portion configured to be fixed to the spindle nut by welding so as to move therewith and configured as a continuous arc of around 180 degrees, the first and second web portions extending from the central portion in opposing directions towards an internal surface of the piston, the first flange extending generally perpendicular from the first web portion at the internal surface, the second flange extending generally perpendicular from the second web portion at the internal surface, the first and second end flanges extend in opposite directions and wherein the first and second flanges are configured to exert a spring load against the internal surface of the piston.

10. The disc brake assembly of claim 9 wherein the anti-rattle clip couples the piston and spindle nut by exerting a tuned load on both the piston and spindle nut.

11. The disc brake assembly of claim 9 wherein the first and second flanges are configured to be one of planar or curved to fit the internal surface.

12. A disc brake assembly for a motor vehicle, the disc brake assembly comprising:
a caliper having a cavity;
a brake lining mounted to the caliper;
a piston mounted in the cavity for displacing the brake lining; and
an electromechanical actuator for supporting the piston, the electromechanical actuator having:
  a drive assembly configured to be operatively connected to a spindle;
  a spindle nut configured to be operatively coupled to the spindle, wherein rotation of the spindle by the drive assembly axially moves the spindle nut to engage and move the piston; and
  an anti-rattle clip configured to operatively couple together the piston and the spindle nut, the anti-rattle clip comprising a singular curved central portion, only a first web portion and a second web portion and only a first end flange and a second end flange, the curved central portion configured to be fixed to the spindle nut so as to move therewith and configured as a continuous arc of around 180 degrees, the first and second web portions extending from the central portion in opposing directions towards an internal surface of the piston, the first flange extending generally perpendicular from the first web portion at the internal surface, the second flange extending generally perpendicular from the second web portion at the internal surface, the first and second end flanges extend in opposite directions, the first and second flanges are configured to exert a spring load against the internal surface of the piston and wherein the first and second flanges are configured to be one of planar or curved to fit the internal surface.

13. The disc brake assembly of claim 12 wherein the anti-rattle clip couples the piston and spindle nut by exerting a tuned load on both the piston and spindle nut.

14. The disc brake assembly of claim 12 wherein the central portion is fixed to the spindle nut by welding.

* * * * *